United States Patent [19]

Skerker et al.

[11] Patent Number: 5,008,508
[45] Date of Patent: Apr. 16, 1991

[54] COOKING APPARATUS FOR SUSPENDING A FOOD PRODUCT

[75] Inventors: Robert B. Skerker, Buffalo, N.Y.; William Prindle, Santa Barbara, Calif.

[73] Assignee: Robinson Knife Manufacturing Co., Inc., Sprinville, N.Y.

[21] Appl. No.: 493,138

[22] Filed: Mar. 13, 1990

[51] Int. Cl.⁵ .............................................. H05B 6/80
[52] U.S. Cl. .............................. 219/10.55 E; 99/419; 99/421 R; 99/DIG. 14; 99/449
[58] Field of Search ................ 219/10.55 E, 10.55 R; 99/419, 449, 421 R, 451, DIG. 14; 211/189, 195; 248/174, 176

[56] References Cited

U.S. PATENT DOCUMENTS

| | | | |
|---|---|---|---|
| 2,584,295 | 2/1952 | Sanzenbacher | 99/419 |
| 4,450,759 | 5/1984 | Steibel | 99/419 |
| 4,558,197 | 12/1985 | Wyatt | 219/10.55 E |
| 4,896,011 | 1/1990 | Trucks | 219/10.55 E |
| 4,924,768 | 5/1990 | Jay | 99/419 |

Primary Examiner—Philip H. Leung
Attorney, Agent, or Firm—Hedman, Gibson, Costigan & Hoare

[57] ABSTRACT

A cooking apparatus for suspending a food product while cooking for use in high heat and microwave environments.

11 Claims, 2 Drawing Sheets

COOKING APPARATUS FOR SUSPENDING A FOOD PRODUCT

FIELD OF THE INVENTION

The present invention is generally directed to a cooking apparatus for suspending a food product to expose the maximum surface area for more uniform cooking and which is particularly suited for cooking raw potatoes and the like in high temperature or microwave environments.

BACKGROUND OF THE INVENTION

A variety of devices exist for baking potatoes in an oven. Certain of these devices include metal racks equipped with upright spikes for impaling a potato. The spikes serve to suspend the potato above the rack to expose all surfaces of the potato to the cooking heat while at the same time conducting heat through the spikes to the interior of the potato to reduce cooking time. However, the spikes do not adequately ventilate moisture and gases from the interior of the potatoes. The presence of excessive moisture and gases within the potato can cause pressure to build up and the potato to explode. In addition, the spikes are sharp and if handled improperly can cause injury to the user.

Other metal racks have been provided with upright pointed teeth made of thin metal on which to impale the potato. However, the teeth suffer the same disadvantages as the spikes in that they do not vent moisture and gases and are dangerous if improperly handled.

The metal racks are difficult to store because of their irregular shape and presence of the potential injury causing spikes or teeth. This is a particular troublesome problem when the racks are stored in cluttered kitchen cabinets.

Recently, microwave cooking has become a popular alternative to oven cooking. Microwave ovens have become popular kitchen appliances and it is apparent that the use of microwave ovens will continue to increase. The metal racks used for baking potatoes are not suitable for use in microwave ovens because metals and other such materials are not microwave compatible. There is therefore a need for microwave compatible appliances that overcome the disadvantages associated with metal racks.

Cookware does exist that has been designed specifically for use in microwave environments. However, such cookware usually takes the form of a tray, pan or a rack made of microwave compatible material. Such cookware is unsuitable for the efficient baking of raw potatoes and the like in a microwave oven mainly because such cookware provides no mean for spacing and positioning the potatoes in a microwave oven for efficient baking.

In addition, current microwave cookware provides no means for venting the potato while baking and thus does not prevent the possibility of an exploding potato which hazard is much greater in the microwave environment than in conventional cooking.

Wyatt, U.S. Pat. No. 4,558,197 discloses a microwave compatible potato cooker in the form of a single piece ring having permanently upstanding blades with associated moisture and gas venting slots. The reference device is adapted to suspend the potato, thereby exposing a large surface area for cooking.

Despite the improvements over metal racks, the reference device is still a potential health hazard because the upstanding blades are always exposed. Thus, when the device is stored in a kitchen cabinet or the like, the blades present threat of puncturing or cutting the user.

Recently, polyetherimides have been developed and it has been discovered that polyetherimides and in particular, polyetherimide bearing the great designation Ultem ®1001 and Ultem ®1010 are virtually unaffected by microwave radiation.

BRIEF DESCRIPTION OF THE INVENTION

It is an object of the present invention to provide a cooking apparatus that can suspend and position potatoes and the like for efficient baking in a microwave oven.

It is a further object of the present invention to provide a cooking apparatus that will be unaffected by high temperatures.

It is a further object of the present invention to provide a cooking apparatus that can be easily assembled and stored.

It is a further object of the present invention to provide a cooking apparatus that will reduce injury to the user.

It is still a further object of the present invention to provide a cooking apparatus that will adequately vent the potato while cooking to prevent the potato from exploding.

Still a further object of the present invention is to provide a cooking apparatus that is sturdy and durable.

Accordingly, the present invention is directed to an apparatus for suspending a food product to expose the maximum surface area for cooking in which the apparatus is assembled from at least two reversibly engageable components so that when disassembled the apparatus may be safely stored without injury to the user.

BRIEF DESCRIPTION OF THE DRAWINGS

The invention will be better understood by way of example with reference to the accompanying drawings in which.

DESCRIPTION OF THE PREFERRED EMBODIMENT

Figure 1:
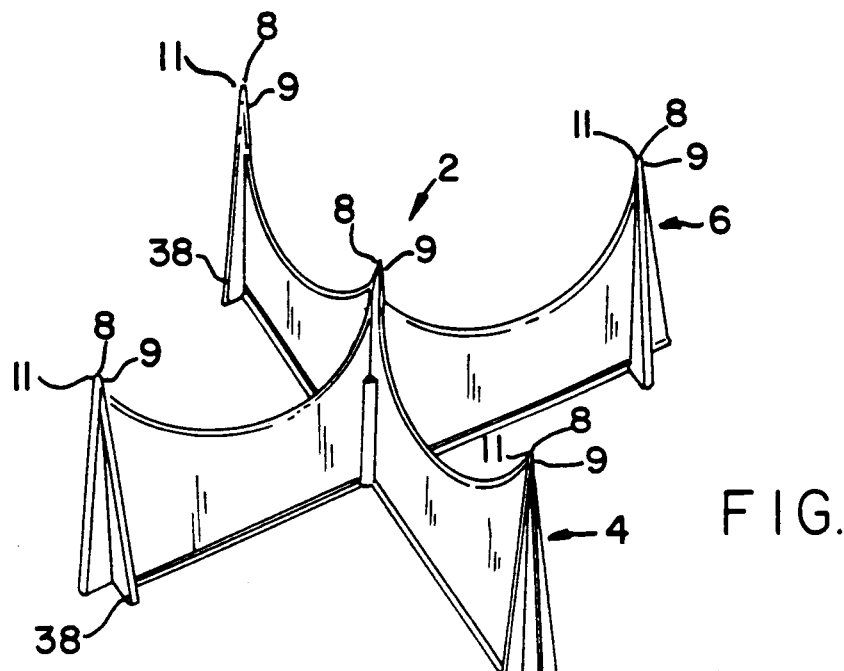
FIG. 1 is a perspective view of the cooking apparatus of the present invention.

The cooking apparatus (2) as seen in FIG. 1 is a substantially cross-shaped cooking apparatus (2) comprised of two reversibly engageable support members (4) and (6) and penetration means (8). The two support members (4) and (6) are more clearly shown in FIGS. 2 and 3.

The penetration means (8) found on support members (4) and (6) are a plurality of spaced apart upwardly extending projections (9). Each projection (9) is configured so as to be able to pierce and enter the food product at a depth sufficient to support the food product in suspended position while cooking. The projections (9) are substantially triangular in shape. Each projection (9) has an apex (11) which is generally round in nature to prevent against injury to the user but is sufficiently sharp to allow for entry and penetration of the skin and meat of a raw potato or other food product.

Figure 2:
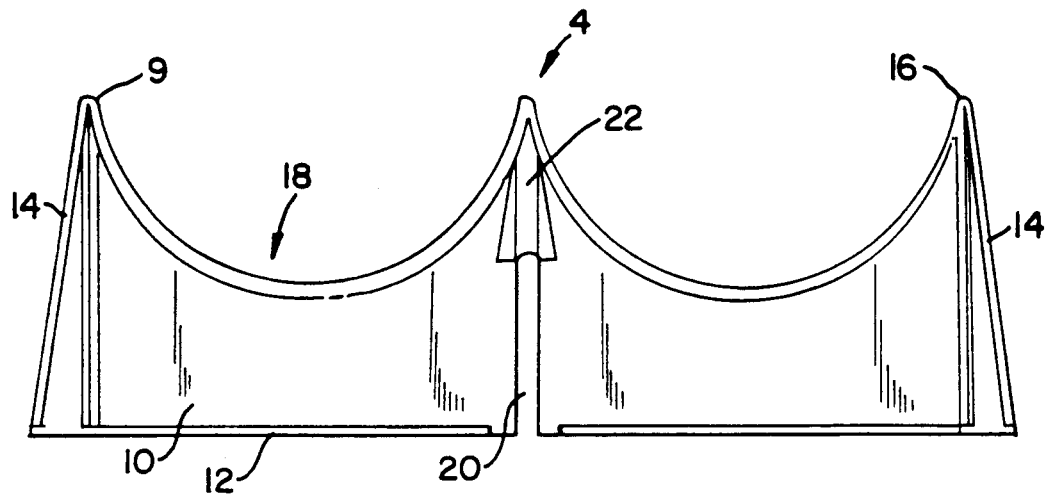
FIG. 2 is an elevational view of one member of the cooking apparatus of the present invention.

Support member (4) as seen in FIG. 2 has an upstanding integrally formed panel (10) and at least one depression (18) separated by at least one projection (9). The panel (10) has a bottom (12) and opposed inclined sides (14) having an arcuate top surface (16). The top surface (16) is adapted to provide clearance from the food product when impaled on the projections (9).

Figure 3:
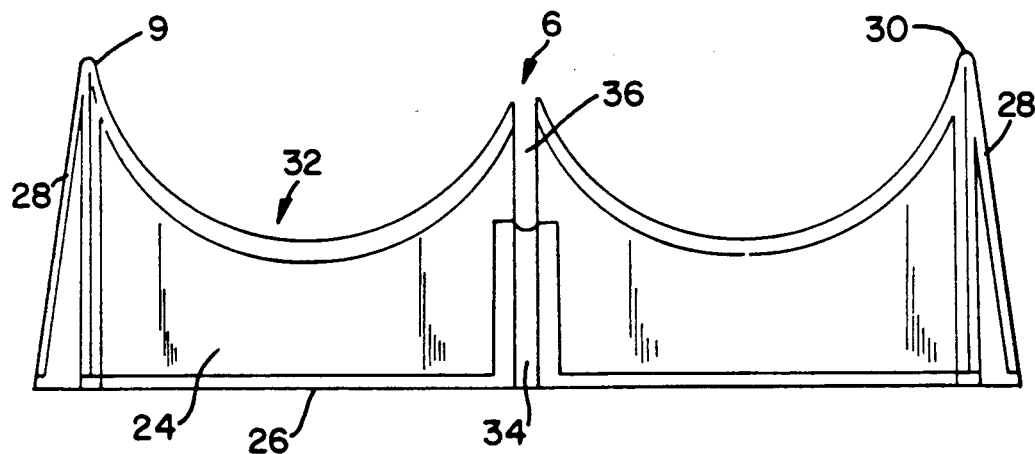
FIG. 3 is an elevational view of a second member of the cooking apparatus of the present invention.

Second member (6) as seen in FIG. 3 is also provided with an upstanding integrally formed panel (24) and at least one depression (32) separated by at least one projection (9). Said panel (24) has a bottom (26) and opposed inclined sides (28) having an arcuate top surface (30) to provide the proper clearance for the food product.

The panel (10) of support member (4) is also provided with a slot (20) that extends upwardly from the bottom (12) of the panel (10) and a channel (22) located directly above and longitudinally aligned with the slot (20).

Extending upwardly from the bottom (26) of the panel (24) of support member (6) is a channel (34). Extending downwardly from the top surface (30) of the panel (24) is a slot (36) wherein said slot (36) is longitudinally aligned with said channel (34).

The slot (20) and channel (22) of the support member (4) and the slot (36) and channel (34) of the support member (6) are adapted to be reversibly insertable into each other to form the cooking apparatus (2) of the present invention.

Figure 4:
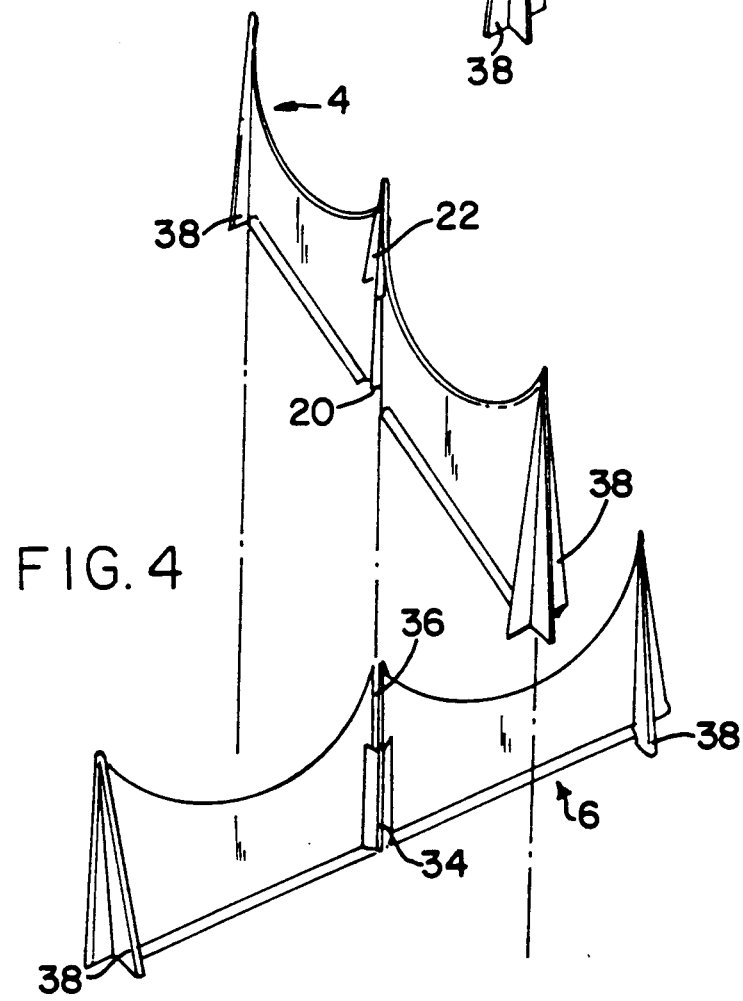
FIG. 4 is an exploded view of FIG. 1 of the cooking apparatus of the present invention.

As seen in FIG. 4, the support member (4) is aligned perpendicularly with the support member (6) so that the slot (20) of the support member (4) is aligned with the slot (36) of the support member (6). The slot (20) is then inserted in the slot (36) and further into channel (34) of the support member (6). Simultaneously, slot (36) of the support member (6) enters the channel (22) of the support member (4) thus creating a substantially cross-shaped or cruciform cooking apparatus (2).

Support members (4) and (6) are also provided with the a means for ventilating moisture and gases from the food product. The ventilation means comprises a plurality of legs (38) as seen in FIGS. 1 and 4 extending from the projections (9) downwardly and outwardly in a spaced apart relationship The legs (38) form a channel in the food product to allow the escape of moisture and gases from the food product. The legs (38) lend stability to the cooking apparatus (2) and also allow each support member (4) and (6) to stand independently and separately on a flat surface.

The configuration of the separate support members (4) and (6) allows for easy assembly, disassembly and efficient storage of the cooking apparatus (2) of the present invention.

The apparatus (2) is made of a microwave compatible material. The preferred material used to form the cooking apparatus is a polyetherimide identified at present by the trademark Ultem ®1010. It is also been found that Ultem ®1000 is another acceptable polyetherimide for use in forming the cooking apparatus of the present invention. Practice also shows that use Ultem ®1010 in constructing the cooking apparatus of the present invention will provide the maximum benefits of this invention. The preferred method of manufacture of the cooking apparatus is conventional injection molding.

The number of projections (9) provided for the cooking apparatus (2) can be varied depending on the dimensions of the support members (4) and (6), however, the number of projections (9) chosen should ensure that the food product will be evenly cooked in the microwave environment. It is believed that for most household microwaves, five projections is preferred. Practice has also shown that the preferred distance between each projection is about 2 ½ to allow for even cooking of raw potatoes and the like.

I claim:

1. An apparatus for suspending a food product while cooking comprising
   (a) a least two reversible engageable support members;
   (b) a plurality of spaced apart penetration means on each of said support members wherein each of the plurality of penetration means comprises an upwardly extending projection adapted to penetrate and suspend the food product; and
   (c) means for ventilating the food product comprising a plurality of legs extending from each of the penetration means downwardly and outwardly in spaced apart relationship thereby forming a channel for the escape of moisture and gases from the food product.

2. The apparatus of claim 1 wherein each of the support members comprises an upstanding integrally formed panel having a depression separated by at least one upwardly extending projection.

3. The apparatus of claim 2 wherein the panel of each support member further comprises a slot and a channel wherein the slot and channel of one support member is adapted to be reversibly insertable into the slot and channel of another support member to thereby form said apparatus.

4. The apparatus of claim 3 wherein each panel is provided with a bottom and opposed inclined sides having an arcuate top surface adapted to provide clearance from the food product when it is impaled on the penetration means.

5. The apparatus of claim 3 wherein the slot of one of said members extends upwardly from the bottom of said panel and wherein said channel is longitudinally aligned with said slot.

6. The apparatus of claim 5 wherein the slot of said other support member extends downwardly from the top surface of said panel and said channel extends upwardly from the bottom of said panel and wherein said slot is longitudinally aligned with said channel.

7. The apparatus of claim 3 wherein the support members are perpendicular when reversibly engaged to each other.

8. The apparatus of claim 2 wherein the projections are generally triangular in shape having a substantially rounded apex.

9. The apparatus of claim 1 wherein the apparatus is made of a microwave compatible material.

10. The apparatus of claim 9 wherein the microwave compatible material is polyetherimide.

11. The apparatus of claim 1 wherein the distance between each of said penetration means is about 2 ½ and the number of penetration means is 5.

* * * * *